W. KROIER.
SELF CLEANING RAKE.
APPLICATION FILED JUNE 9, 1919.
1,334,909.
Patented Mar. 23, 1920.
2 SHEETS—SHEET 2.
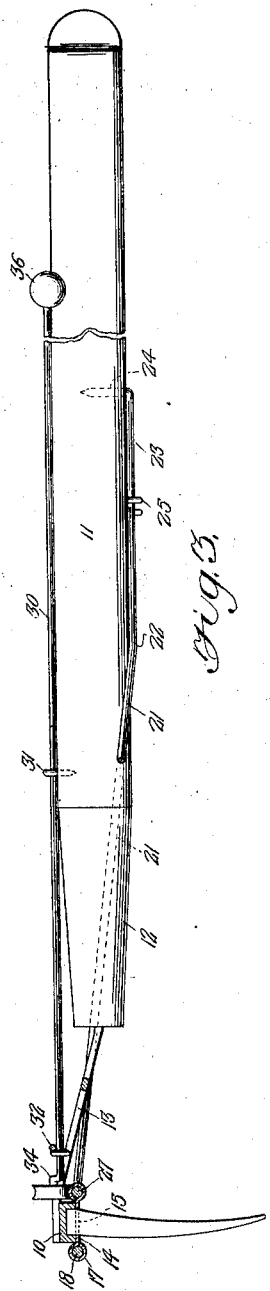
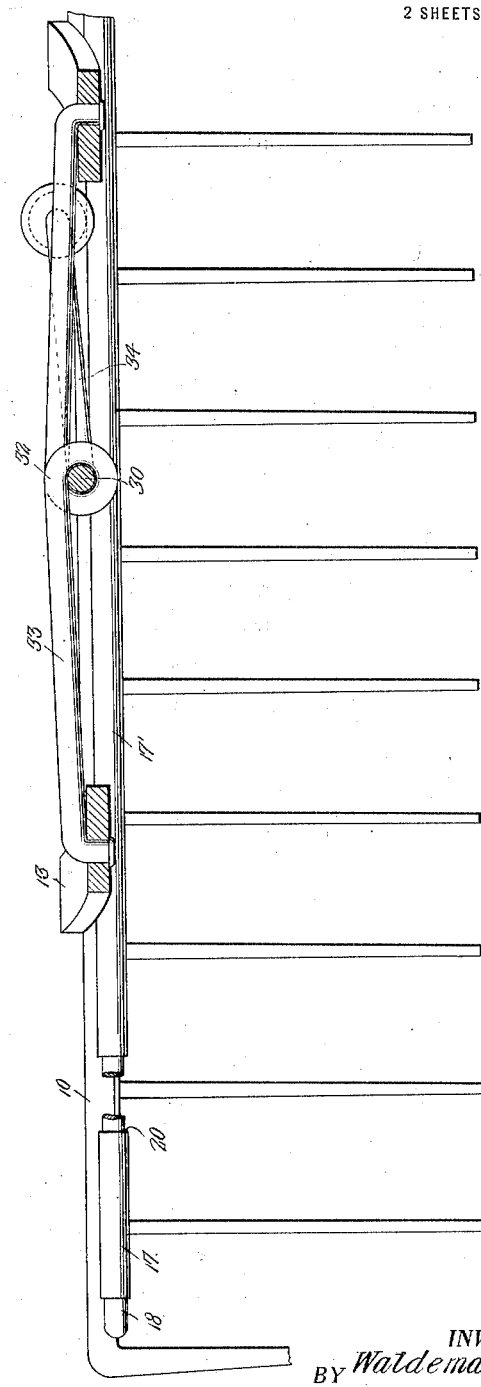
WITNESSES
INVENTOR.
BY Waldemar Kroier,
ATTORNEY.

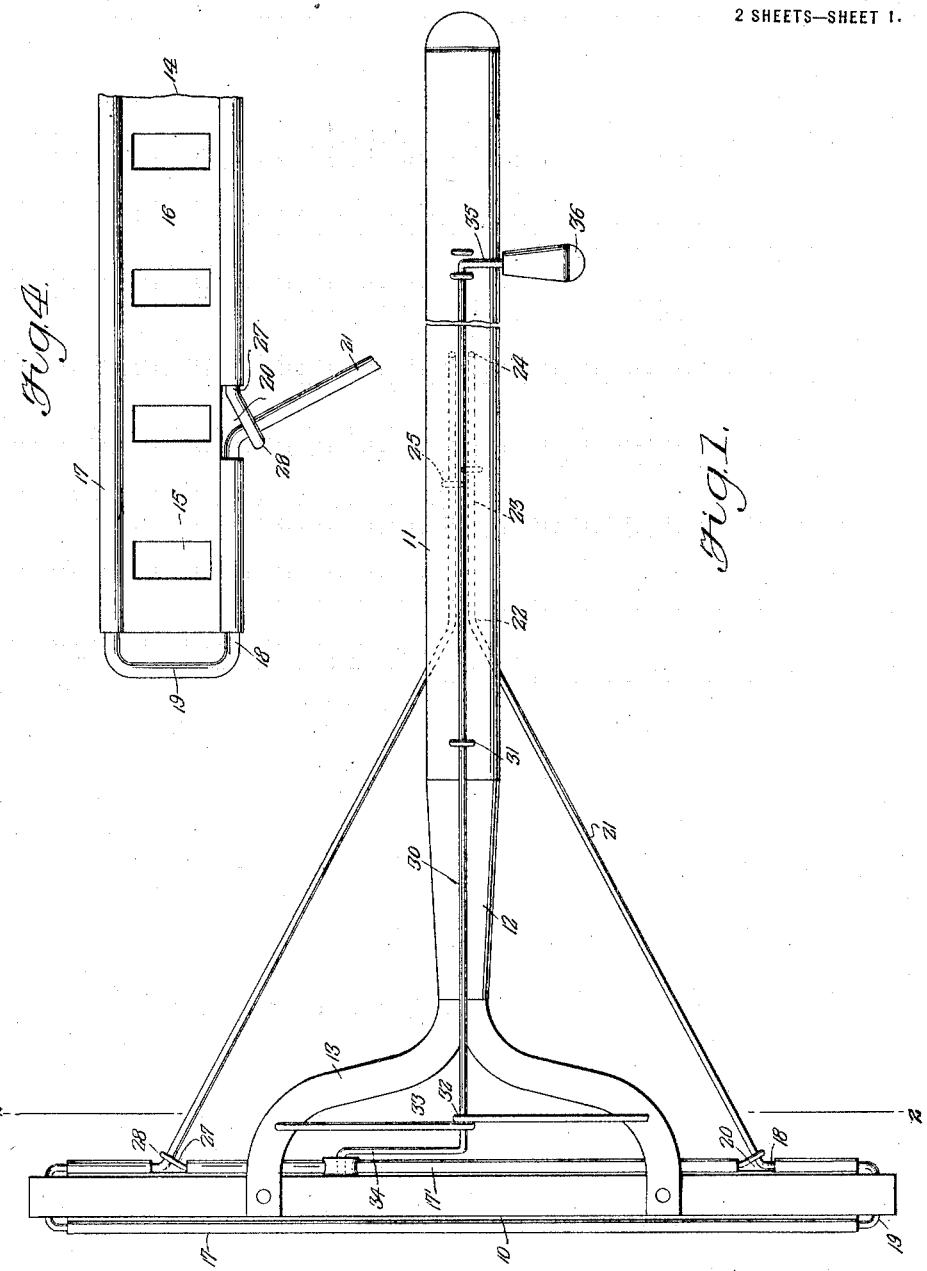

UNITED STATES PATENT OFFICE.

WALDEMAR KROIER, OF JACKSONVILLE, FLORIDA.

SELF-CLEANING RAKE.

1,334,909.　　　Specification of Letters Patent.　　Patented Mar. 23, 1920.

Application filed June 9, 1919. Serial No. 302,848.

*To all whom it may concern:*

Be it known that I, WALDEMAR KROIER, a citizen of United States of America, residing at Jacksonville, in the county of Duval and State of Florida, have invented new and useful Improvements in Self-Cleaning Rakes, of which the following is a specification.

This invention comprehends the provision of a cleaning attachment for rakes, designed for association with the teeth of the rake, and a manipulating element arranged upon the handle where it can be conveniently operated to move the attachment to an active position, the attachment automatically returning to normal position upon release of the operating element.

The nature and advantages of the invention will be better understood when the following detail description is taken in connection with the accompanying drawings, the invention residing in the construction, combination, and arrangement of parts as claimed.

In the drawings forming part of the specification like numerals of reference indicate similar parts in the several views and wherein:

Figure 1 is a top plan view of a rake showing the attachment associated therewith.

Fig. 2 is a transverse sectional view taken on the line 2—2 of Fig. 1.

Fig. 3 is a side elevation partly in section.

Fig. 4 is a fragmentary detail view of the cleaning attachment removed from the rake.

Referring more particularly to the drawings in detail, 10 indicates the head of the rake including the teeth, the handle 11 being fitted within a metallic socket 12 forming part of the yoke 13 which is terminally secured to the head 10.

The attachment forming the subject matter of my invention consists of an elongated strip of metal indicated at 14 the latter being of a length substantially equal to the length of the head 10, against which it is adapted to be normally disposed. The strip of metal 14 is provided with transverse slots 15 through which the teeth of the rake project, while the intervening members 16 between said slots are arranged between the teeth to clean the latter in a manner to be hereinafter more fully described. The opposite longitudinal edges of the strip 14 are rolled as at 17 to receive the parallel portions 18 of an elongated wire frame, the ends 19 of which are arranged between the final pair of teeth at the corresponding extremities of the heads 10. One of the rolled portions 17 of the strip is cut away at spaced points as at 20 to permit the material or wire constituting the frame to converge rearwardly in the direction of the handle to provide resilient arms 21 which meet at a point centrally of the handle as at 22, the arms from this point extended in parallel relation an appreciable distance lengthwise of the handle, the parallel portions 23 terminating to provide spurs 24 which are driven into the handle as shown. Staples or the like indicated at 25 are utilized to assist the spurs 24 in securing the arms to the handle in the manner shown. The converging arms 21 being of a resilient nature supports the frame together with the metallic strip 14 immediately beneath the head 10 of the rake, the converging portions 21 being obviously disposed with respect to the parallel portions 23 and at an angle with relation to the handle 11 and the head 10 of the rake. Passed through the rolled portion 17' of the strip 14 is a wire element 27 which projects beyond the ends of the rolled portions terminating to provide eyes 28 receiving the resilient arms 21. The wire element 27 constitutes a brace for the arms 21.

An operating rod 30 extends longitudinally of the handle 11 and is capable of being turned in the staples 31 which are utilized to attach the operating rod to the handle. The rod is also passed through an eye 32 formed intermediate the ends of a wire brace 33 terminally secured to the yoke 13. The opposite ends of the operating rod 30 are reversely bent at right angles to the rod, one end being relatively long as at 34 and disposed in engagement with the metallic strip or cleaning element 14. The opposite end of the rod 35 supports a knob or the like 36 in convenient reach of the user, the knob 36 being adapted to be grasped in one hand in order to turn the rod upon the handle when desired. Normally, the cleaning element 14 is arranged in close proximity to the head 10 of the rake and the knob 36 projects beyond one side of the handle. With the parts so disposed, the rake can be used with the same convenience as a rake without the attachment. However, when it is desired to clean a rake, the knob 36 is moved to the opposite side of the handle, thus turning the operating rod 30 and during this movement of the rod, the end 34 bearing against the cleaning element 14 depresses the latter to a position where it removes everything which has the tendency to cling to the teeth of the rake. It is of course understood, that as the cleaning element 14 is depressed, the arms 21 are placed under tension, and when the knob 36 is released the arms 21 functionate to automatically return the parts to normal position. The attachment as an entirety can be applied to most any form of rake, and can be conveniently manipulated for the purpose intended.

While I have shown and described what I consider the preferred form of the invention, I desire to have it understood that I do not limit myself in this connection, and that such changes may be resorted to when desired as fall within the scope of what is claimed.

What I claim is:

1. A cleaning attachment for rakes, comprising a frame including members arranged between the teeth of the rake, yieldable means normally holding said frame adjacent the head of the rake, an operating rod journaled upon the handle, and having offset extremities, a knob carried by one extremity for turning said rod, and the other of said extremities bearing against the frame for moving the latter to an active position when the rod is turned against the tension of said means.

2. A cleaning attachment for rakes, comprising a frame including members arranged between the teeth of the rake, resilient arms projecting from the frame in the direction of the handle of the rake, means for connecting the arms to the handle, said resilient arms being disposed to normally maintain the frame adjacent the head of the rake, an operating rod journaled upon the handle and having an offset extremity bearing against said frame, and means for turning the rod whereby said offset extremity moves said frame to an active position against the tension of said arms.

3. A cleaning attachment for rakes comprising a cleaning element slidably engaging the teeth of the rake, yieldable means for normally holding said element adjusted to the head of the rake, an operated rod journaled on the handle and having an offset extremity, a roller carried by said extremity and bearing against said element for moving the latter to an active position against the tension of the yieldable means when the rod is turning in one direction.

4. A cleaning attachment for rakes comprising a cleaning element slidably engaging the teeth of the rake, said element having its longitudinal edges rolled, an elongated wire frame positioned within said rolled edges, one side of said frame being extended to provide convergently disposed resilient arms connected with the handle of the rake, said arms holding the cleaning element normally adjusted ahead of the rake, and means carried by the handle and operable to move said cleaning element to active position against the tension of said arms.

5. The combination with a rake including a yoke, or a cleaning element slidably mounted upon the teeth of the rake, yieldable means for normally holding said element adjusted ahead of the rake, a rod journaled on the handle and having a connection with said element, whereby the latter is moved to active position when the rod is turned in one direction, a brace member extended transversely of and terminally connected with said yoke, and said member having an eye constituting a bearing with said rod.

In testimony whereof I affix my signature.

WALDEMAR KROIER.